Dec. 13, 1932.　　　　W. B. LAKE　　　　1,890,735
BRAKE
Filed Oct. 5, 1931　　　4 Sheets-Sheet 1

INVENTOR
W. B. Lake
BY
ATTORNEY

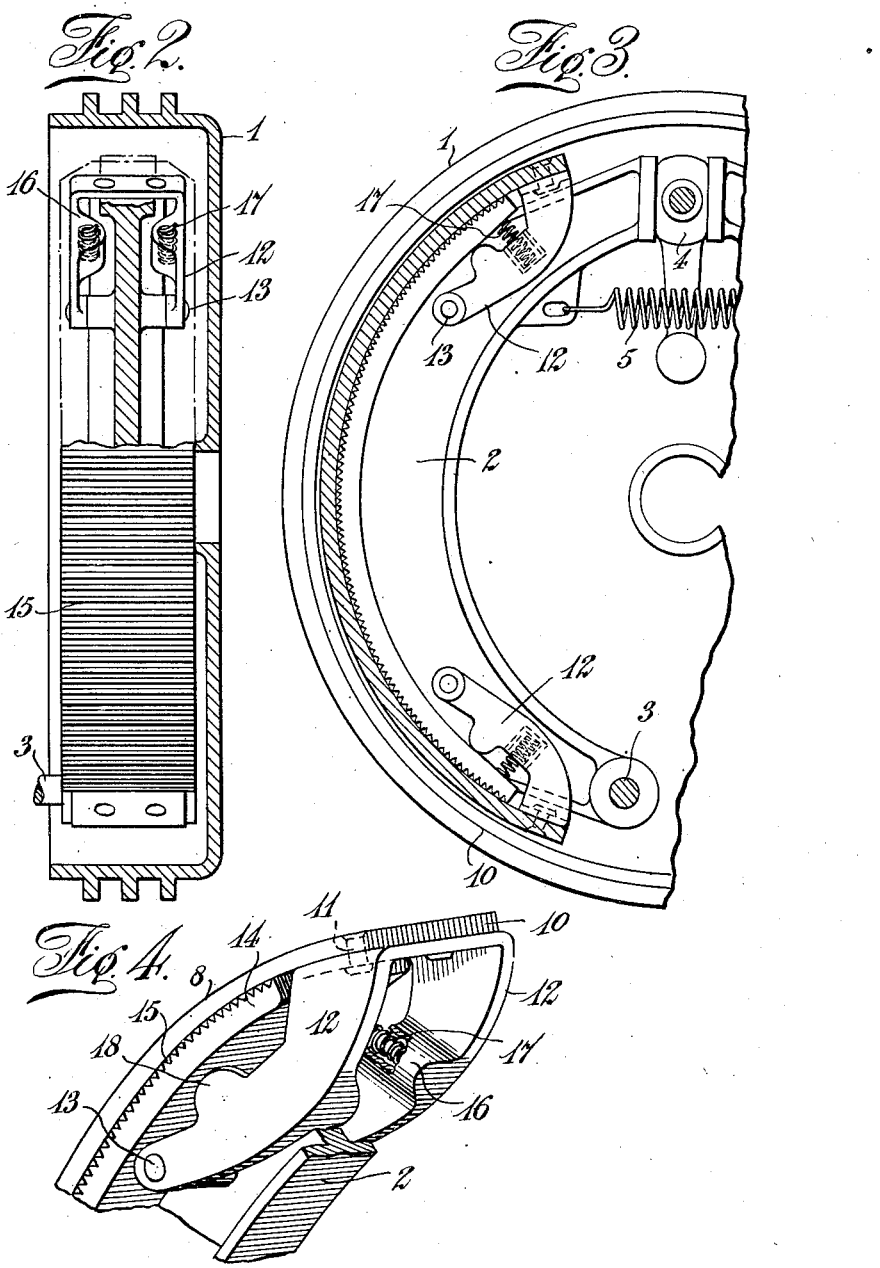

Dec. 13, 1932.  W. B. LAKE  1,890,735
BRAKE
Filed Oct. 5, 1931  4 Sheets-Sheet 3

INVENTOR
W. B. Lake
BY
ATTORNEY

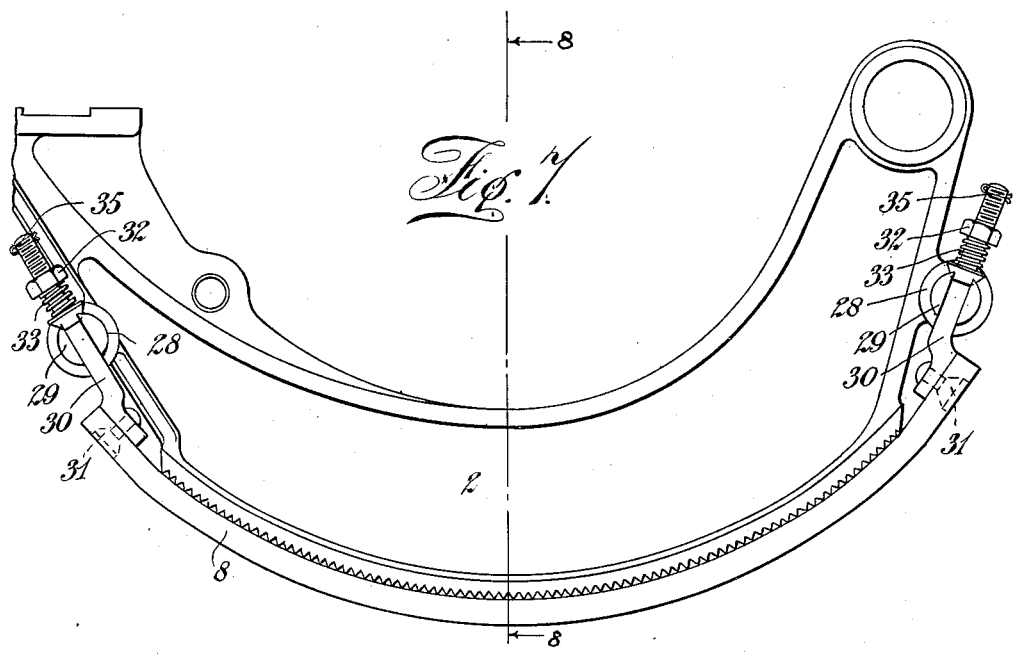
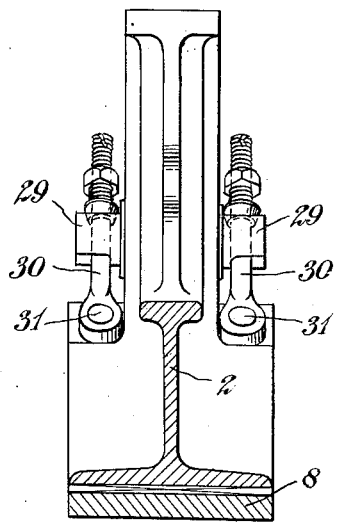

Patented Dec. 13, 1932

1,890,735

UNITED STATES PATENT OFFICE

WILLIAM BEARD LAKE, OF MOUNT PLACE, BRAINTREE, ENGLAND

BRAKE

Application filed October 5, 1931, Serial No. 567,016, and in Great Britain October 16, 1930.

This invention relates to improvements in brakes, more particularly for use on motor road and other vehicles.

Heretofore in brake shoes employed on brakes of the internal expanding type, it has usually been necessary to secure the lining to the brake shoe by a large number of rivets in order to prevent expansion, incident to the heat of the shoe, stretching and consequent buckling of the brake shoe lining.

The chief object of the present invention is to overcome this defect and to provide improved means for securing linings to brake shoes which will be more efficient in use and smoother in action.

A further object is to so secure a brake shoe lining of any usual or convenient kind to the brake shoe that the said lining will be free to stretch and expand so that the brake will act more efficiently and wear will be reduced to the minimum.

A still further object is to provide improved means for connecting the brake shoe lining to the brake shoe, which can readily be assembled and easily detached for fitting a new lining.

With these and other objects in view the invention consists in mounting the brake shoe lining on the brake shoe so that the said lining is free to stretch throughout the main portion of its length.

The invention further consists in securing one or both ends of the lining to a brake shoe in a resilient manner, such as by means of bolts connected with the shoe through the medium of springs mounted on the said bolts.

The invention still further consists in securing to one or both ends of the lining an eye bolt or bolts, which bolts are adapted to be resiliently connected with a transversely arranged member provided on the brake shoe, said transversely arranged member preferably being free to turn slightly in its bearing or bearings, the arrangement being such that the rivets securing the ends of the lining to the eye bolts will always be out of contact with the brake drum.

The invention still further consists in forming or providing the shoe with a serrated or toothed surface adapted to engage and co-operate with the lining so that in use the friction betwen the face of the brake shoe and the lining will be greater than the friction between the lining and the brake drum.

The invention also consists in securing the normal leading end of the brake shoe lining to the brake shoe or to a saddle piece or the like pivotally mounted on the front end of the said brake shoe, the rear end of the lining being connected to another pivoted saddle piece or the like so arranged that the trailing end of the lining will be normally moved away from the brake drum, so as to permit of the free expansion or stretch of the said lining.

The invention will now be described with reference to the accompanying drawings, in which:—

Figure 2 is a longitudinal sectional elevation thereof;

Figure 3 is a modification of the invention showing part of an internal expanding brake;

Figure 4 is the perspective view showing an improved carrier for the brake lining;

Figure 7 is a similar view to Figure 5 showing a still further modified construction, and F'gure 8 is a sectional elevation taken on the line 8—8 of Figure 7.

Figure 1:
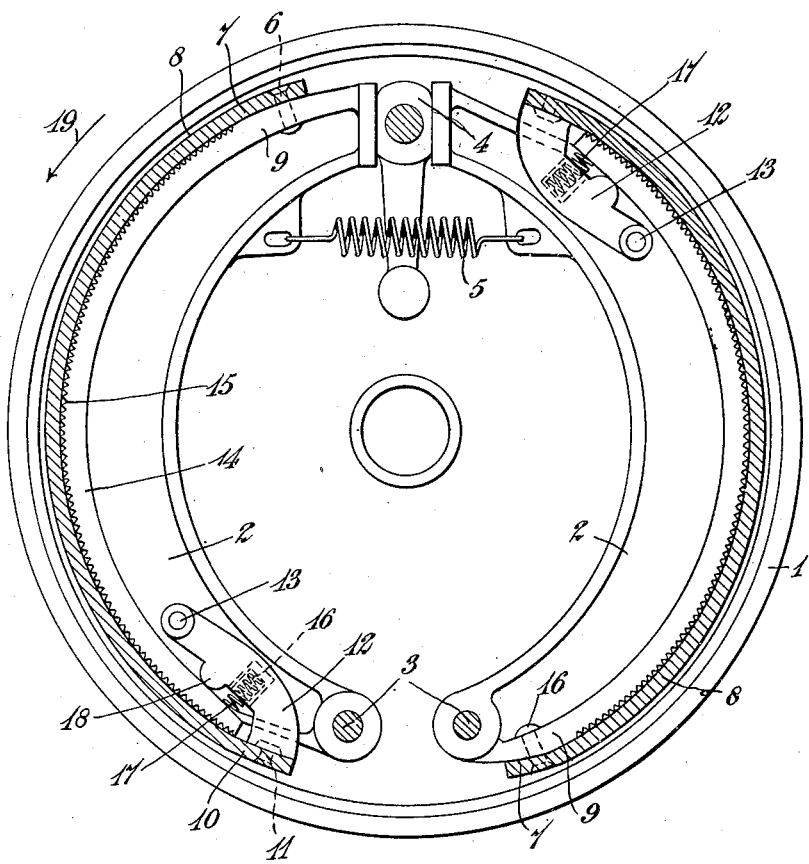
Figure 1 is a sectional elevation of one form of internal expanding brake constructed according to this invention.

As shown more particularly in Figures 1, 2 and 4, the internal expanding brake comprises an outer brake drum 1 and a pair of shoes 2, which latter are pivoted on fulcrums 3, and adapted to be moved towards the brake drum by a cam or the like 4 against the action of spring means 5 in the usual manner. Each shoe 2 consists of a framework or the like and to the normal forward end of each framework is secured by rivets 6 one end 7 of a brake shoe lining 8. The portion 7 of the brake shoe lin'ng is securely riveted, preferably by a pair of rivets 6, to an inwardly inclined seating 9 formed on each brake shoe 2. The rear or trailing end 10 of each brake shoe lining 8 is secured by rivets or the like 11 to a saddle piece 12. Each saddle piece 12 is of substantially U-shape and the arms of the saddle piece 12 are connected by a fulcrum pin or pins 13 to the sides of the framework of the shoe 2. The fulcrum 13 is preferably arranged as near as possible to the wearing edge or outer surface of the shoe 2 so as to provide a locking effect. This locking effect is gained by arranging the fulcrum 13 as nearly as possible to the wearing edge, for thereby the pull is as near in line with the end of the lining as possible. The brake shoe lining 8 is of usual construction, such as a composition of fibre asbestos and copper, and each lining 8 is adapted to lie on the outer surface 14 of each brake shoe 2 or on a plate provided on the framework of the shoe 2. The outer surface 14 is suitably roughened or toothed transversely, as indicated at 15, so as to co-operate with the inner face of the brake lining 8. Each arm of the saddle piece 12 is formed or provided with a housing 16 for a coil spring or the like 17. Each coil spring 17 is adapted to abut at one end in the base of the housing 16 of the saddle piece 12 and at its other end against the under surface of the outer plate or portion 14 of the shoe 2. Thus the trailing end of the lining 8 will be normally kept away from the inner or contacting surface of the brake drum 1. The arms of each saddle piece 12 are formed or provided with stops 18 to co-operate with the portion 14 of the shoe 2 so that the trailing ends of the l'ning 8 are slightly inwardly curved away from the surface of the brake drum 1. Obviously the forward and/or the trailing ends of the lining may approximately conform to the same curvature as the main portion of the lining, or the arrangement may be such that these ends of the lining 8 will be normally away from the inner face of the brake drum. Obviously as there is no pressure applied on the connected ends, the said lining may be worn down to a minimum thickness before the rivets in the connected ends of the lining contact with the inner surface of the brake drum. The rivets 6 and 11 securing the ends of the brake lining 8 are preferably counter-sunk into the said lining 8 so as to further prevent them contacting with the brake drum, even after considerable wear on the lining. The arrow 19 on Figure 1 indicates the normal direction of rotation of the brake drum 1 and it will be seen that the brake shoe linings 8 will be free to stretch and expand throughout their length and, further, the connected ends of the said l'nings will not contact with the brake drum 1.

In the modified construction as shown in Figure 3, each brake shoe lining 8 is connected at each end to a saddle piece or the like 12. These saddle pieces 12 are similar to those previously described and are pivoted to the brake shoes 2 by fulcrum pins or the like 13. The saddle pieces 12 are formed with stops 18 and fitted with springs 17 as in the previous construction. If desired, the springs in the saddle piece at the normal forward end of each brake shoe lining may be omitted.

Figure 5:
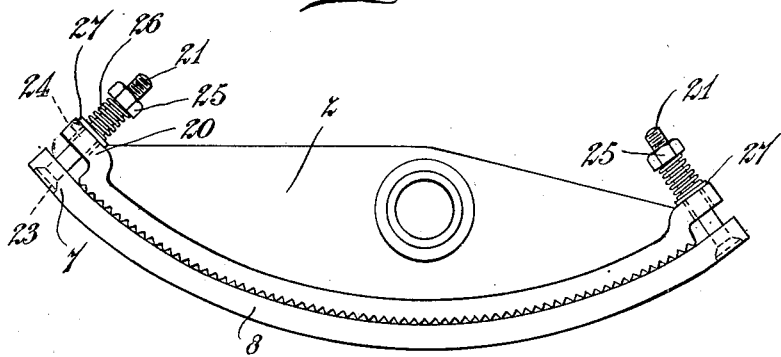
Figure 5 is a side elevation of a further modified construction.
Figure 6:
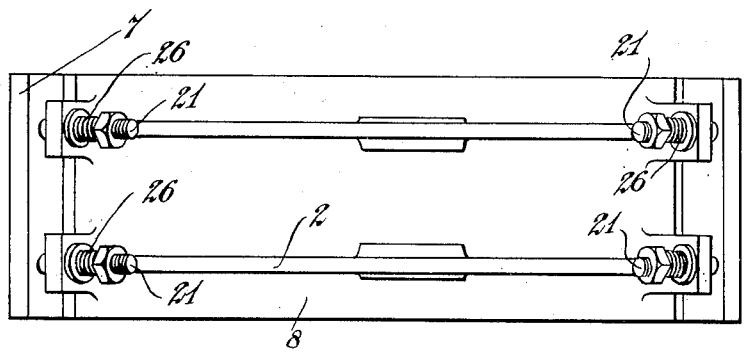
Figure 6 is a plan thereof.

In a further modified construction, as shown in Figures 5 and 6, the portions 7 of the brake shoe lining 8 are secured to lugs 20 formed on the end of the brake shoe 2 by means of bolts or screws 21. The heads of these screws 21 are counter-sunk into the brake shoe lining 8 as indicated at 23 and the screws pass through slots or holes 24 cut in the said lugs 20. On the screwed ends of these screws 21 are provided nuts 25 which form an abutment for one end of springs 26 which springs surround the screws 21 and have an abutment against the lugs 20 on the shoe 2 or against washers 27 positioned on the said lugs 20. Thus the brake shoe linings 8 are free to expand and by connecting the ends 7 of each lining 8 in the manner shown the heads of the screws or bolts 21 will not contact with the brake drum even after considerable wear on the lining 8. Further, it will be seen that new linings can be readily fitted to the shoes when required.

In a still further modified construction, as shown in Figures 7 and 8, each brake shoe 2 is formed at each end with bearings or bushes 28 for the reception of a transversely arranged pin member 29. The projecting ends of each pin member 29 are bored or slotted to receive a pair of eye bolts or the like 30. The eye portions of these bolts are secured by rivets or other suitable means 31 to the ends 7 of the brake shoe lining 8, the brake shoe 2 being suitably cut away or formed to receive the eye bolts 30 in such a manner that the said eye bolts 30 and the rivets 31 will not contact with the brake drum. The outer end or stem of each eye bolt 30 is screwed to receive nuts or other securing means 32 and between the nuts 32 and the transversely arranged pin 29 carrying the eye bolts 30 is disposed a coil spring or the like 33. These springs 33 are arranged on the stems of the eye bolts 30 and one end of each spring 33 has an abutment against the nut 32 and the other end of the spring 33 has an abutment preferably against a washer 34 on the said eye bolt 30. The washers 34 are preferably in the form of a cone and fit in conical recesses in the holes or slots cut in the pins 29 to receive the eye bolts 30. Any suitable means, such as split pins 35, may be provided to prevent the nuts 32 from unscrewing off the eye bolts 30 in the event of excessive vibration.

In the construction shown in Figures 5 to 8 the face of the brake shoe 2 is serrated or roughened at 15 in the manner previously described and it will be seen that the secured ends 7 of the lining 8 will be out of contact with the brake drum and that the said lining 7 will be free to stretch and expand and that the stretch or expansion will be taken up by the springs. It will be further seen that the linings can be solidly anchored at each end to the shoe by fully compressing the springs by the nuts, but the arrangement is such that any stretching of the lining will be taken up by the springs and the ends of the lining will be drawn inwards so that they will not contact with the drum.

In all the constructions shown new linings can be readily fitted to the shoes when it is desired to replace the linings, and it will be seen that the ends of the lining project beyond the working face and are secured to the brake shoe by resilient means which draw the ends inwardly and retain the lining in contact with the face of the shoe when the ends are forced further inwards owing to the wear on them being less than on the working part of the lining.

What I claim is:—

1. A brake of the internal expanding type including a brake shoe and a lining therefor, and resilient means for connecting one end of the lining with the shoe.

2. A brake of the internal expanding type including a brake shoe and a lining therefor, and resilient means for connecting one end of the lining with the shoe, said resilient connection maintaining that end of the lining offset relative to the operative line of contact with the remaining length of the lining.

3. A brake of the internal expanding type including a shoe and a lining therefor, members rigidly secured to the ends of the lining, and means for maintaining said members connected to the shoe for limited tensioned play with respect to the shoe.

4. A brake of the internal expanding type including a shoe, a lining therefor, bolts rigidly connected to the ends of the lining, and means for connecting the bolts for limited tensioned play with respect to the shoe.

5. A brake of the internal expanding type including a brake shoe and a lining therefor, bolts rigidly connected to the respective ends of the lining, said bolts passing through openings in the shoe for limited free play of the bolts relative to the shoe, and springs carried by the bolts for tensioning such play.

6. A brake of the internal expanding type including a brake shoe and a lining therefor, bolts rigidly connected to the respective ends of the lining, said bolts passing through openings in the shoe for limited free play of the bolts relative to the shoe, springs carried by the bolts for tensioning such play, and means for adjusting the tension of the springs.

7. A brake of the internal expanding type including a brake shoe and a lining therefor, bolts rigidly secured in the ends of the lining, relatively offset lugs formed on the shoe, said lugs being formed with openings to loosely receive the bolts, nuts on the bolts beyond the shoe, and springs on the bolts bearing between the nuts and the lugs.

8. A brake of the internal expanding type including a shoe and a lining therefor, and means for resiliently connecting the respective ends of the lining to the shoe, the shoe intermediate the resilient connections being roughened for cooperation with the inner surface of the lining.

9. A brake of the internal expanding type including a shoe, a lining therefor, means for resiliently connecting the ends of the lining to the shoe to normally maintain said lining ends out if the plane of operative contact of the shoe, the resiliency of said connecting means being variable at will.

10. A brake of the internal expanding type including a shoe and a lining therefor, bolts connected to the lining and passing through holes formed in members arranged transversely of the shoe, the ends of the lining being normally out of line with the operative contacting surface of the lining, and springs to maintain the tension of the connection between the lining and shoe.

11. A brake of the internal expanding type including a shoe and a lining therefor, bolts passing through the lining and through openings formed in members arranged transversely of the shoe and rotatable therein, the ends of the lining being normally out of line with the normal contacting plane of the lining, and springs to maintain the tension of the lining on the shoe.

12. A brake of the internal expanding type including a shoe, a lining therefor, bolts carried by the lining and passing through slots formed in members arranged transversely of the shoe, the bolt-carried ends of the lining being normally out of the operative plane of contact of the lining, springs cooperating with the bolts to maintain the tension of the lining on the shoe, the surface of the shoe intermediate the connections being roughened.

13. A brake of the internal expanding type including a shoe and a lining therefor, means for resiliently connecting the ends of the lining to the shoe, said connecting means permitting relative play of the lining and shoe and serving to hold the respective ends of the lining out of the operative plane of contact of said lining with a brake drum, that portion of the shoe intermediate the connections being roughened.

14. A brake of the internal expanding type including a shoe, a lining therefor, bolts carried by the respective ends of the lining, lugs formed on the shoe offset inwardly with respect to the operative face of the lining, said lugs being formed with openings to permit the passage of the bolts therethrough, and spring means for yieldingly connecting the bolts and shoe, said spring means operating to offset the bolt-carried ends of the lining with respect to the drum-engaging surface of the lining.

15. A brake of the internal expanding type including a shoe, a lining therefor, bolts carried by the respective ends of the lining, lugs formed on the shoe offset inwardly with respect to the operative face of the lining, said lugs being formed with openings to permit the passage of the bolts therethrough, spring means for yieldingly connecting the bolts and shoe, said spring means operating to offset the bolt-carried ends of the lining with respect to the drum-engaging surface of the lining, and means for adjusting the tension of said springs.

16. A brake of the internal expanding type including a shoe and a lining therefor, a member pivoted to the brake shoe, the free end of the member being connected to the lining, the mounting of the member maintaining the connected end of the lining out of the plane of the drum-engaging face of the lining.

17. A brake of the internal expanding type including a shoe and a lining therefor, a saddle member pivotally connected to one end of the shoe, a connection between one end of said member and the lining, means for resiliently influencing the saddle member with respect to the shoe, and means for limiting play of the shoe in one direction to thereby prevent the connected end of the lining from moving into the plane of the drum-engaging surface of the lining.

In testimony whereof I have hereunto signed my name.

WILLIAM BEARD LAKE.